United States Patent
Bell et al.

[19]

[11] Patent Number: 5,896,729
[45] Date of Patent: Apr. 27, 1999

[54] TWO-PIECE TUBE

[75] Inventors: Sonny Bell, Morgan Hill; Buddy Chang, San Jose; Xavier Charles Lelong, San Jose; Edward Joseph Pacheco, San Jose; Bruno Alejandro Valdes, Sunnyvale; Michael Zung, San Jose, all of Calif.

[73] Assignee: International Business Machine Corporation, Armonk, N.Y.

[21] Appl. No.: 09/025,512

[22] Filed: Feb. 18, 1998

[51] Int. Cl.⁶ .................................................. B65D 73/02
[52] U.S. Cl. .............................. 53/471; 53/485; 206/525; 206/722
[58] Field of Search ................................. 206/303, 525, 206/701, 713, 714, 716, 718, 722, 723, 724; 53/471, 485

[56] References Cited

U.S. PATENT DOCUMENTS

| | | |
|---|---|---|
| 4,485,531 | 12/1984 | Murphy . |
| 4,655,364 | 4/1987 | Swapp et al. . |
| 4,867,308 | 9/1989 | Crawford et al. ................ 206/714 |
| 5,064,063 | 11/1991 | Manca et al. . |
| 5,226,226 | 7/1993 | Fierkens .............................. 206/713 |
| 5,232,091 | 8/1993 | Hennessy et al. . |
| 5,242,051 | 9/1993 | Murphy . |
| 5,348,150 | 9/1994 | Brenner et al. . |
| 5,435,446 | 7/1995 | Hosseinmardi et al. ............. 206/713 |
| 5,682,731 | 11/1997 | Althouse ............................ 206/713 |

FOREIGN PATENT DOCUMENTS

| | | |
|---|---|---|
| 4-201887 | 7/1992 | Japan . |
| 1761628 | 9/1992 | Saudi Arabia . |

*Primary Examiner*—Paul T. Sewell
*Assistant Examiner*—Luan K. Bui
*Attorney, Agent, or Firm*—Monica D. Lee

[57] ABSTRACT

A container for shipping and handling devices is described. The container is particularly well suited to store sliders used in magnetic storage systems. The container includes a bottom piece and a detachable top piece. The bottom piece includes a base with a channel (also referred to as a device chamber) and two side walls. At least one device is stored in a channel in the base. The detachable top piece is secured to the bottom piece with a locking device. The locking device may include two substantially straight edges and two curved outer ridges. When the top piece is attached to the bottom piece, each of the curved outer ridges of the locking device extends into a groove in the inner surface of the side walls. The devices are contained within the container by a pair of slider stop devices.

12 Claims, 6 Drawing Sheets

SECTION A-A

SECTION B-B

TWO-PIECE TUBE

BACKGROUND OF THE INVENTION

1. Field of the Invention

The present inventions relates to containers useful for shipping and handling a plurality of devices, and in particular devices such as air bearing sliders used in magnetic storage systems.

2. Description of Related Art

A magnetic storage system typically includes one or more magnetic disks with at least one data recording surface having a plurality of concentric tracks for storing data. A spindle motor and spindle motor controller rotate the disk(s) at a selected rotations per minute (rpm) such that at least one read/write transducer or "head" per recording surface can read data from or write data to each recording surface. The data read or written from each recording surface is processed by a read/write channel. The transducer is supported by an air bearing slider which has a top surface attached to an actuator assembly via a suspension, and a bottom surface having an air bearing design of a desired configuration to provide favorable flying height characteristics. During the operation of the magnetic storage device, the air bearing slider is positioned in close proximity above the desired data track by an actuator assembly. The movement of the actuator assembly above the disk surface is controlled by a servo system.

In magnetic recording technology, it is continually desired to improve the areal density at which information can be recorded and reliably read. Because the recording density of a magnetic storage system is limited by the distance between the transducer and the recording surface of the disk, it is generally desirably to design an air bearing slider to "fly" as closely as possible to the recording surface of the disk while avoiding physical impact with the disk. Smaller spacings, or "flying heights" allow the transducer to distinguish between the magnetic fields emanating from closely spaced regions on the disk.

Lower flying heights may require air bearing sliders having reduced dimensions. Many sliders today are referred to as nano sliders and are on the order of approximately 2 mm×1.5 mm×0.45 mm. However, newer generations of sliders may be referred to as pico sliders and are often approximately 33% the size of nano sliders. For example, a pico slider may have dimensions of approximately 1.5 mm×1.0 mm×0.3 mm. As the dimensions of the sliders are reduced, the containers used to ship and handle these devices are downsized accordingly.

Figure 1A:
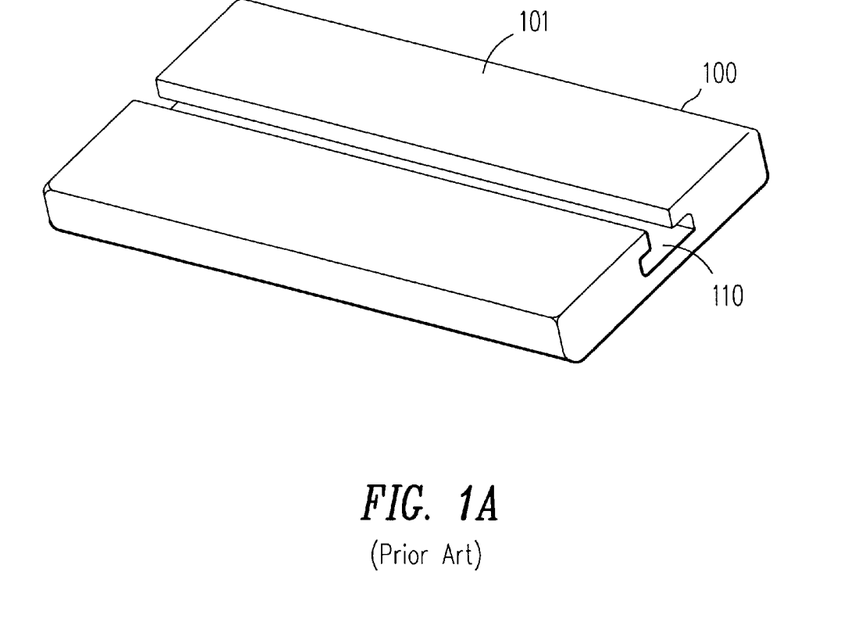
FIG. 1A Illustrates perspective view of a conventional shipping container for transporting and handling sliders.
Figure 1B:
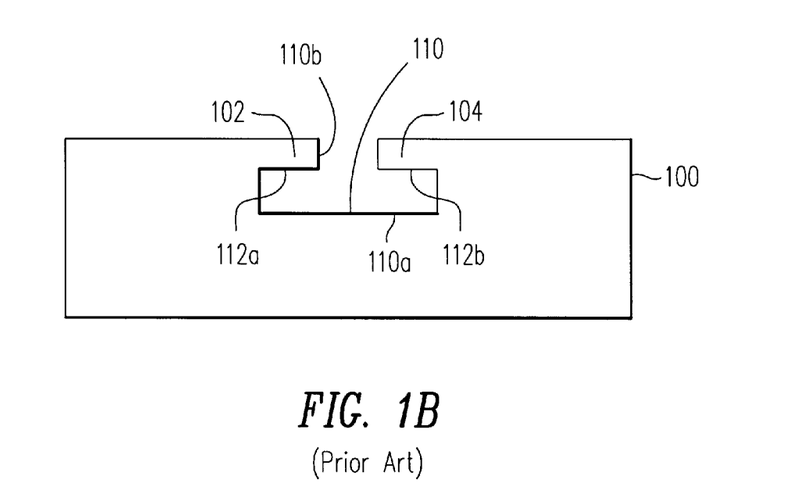
FIG. 1B illustrates a cross-sectional view of the shipping container shown in FIG. 1A.

FIGS. 1A–B illustrate a conventional one-piece shipping tube 100 for shipping and handling air bearing sliders. Shipping tube 100 includes an inverted T-slot that extends the entire length 101 of shipping tube 100. The air bearing sliders are stored in the wide portion 110a of T-slot 110. The wide portion 110a may be referred to as the channel. Neck regions 102 and 104 define the narrow portion 110b of T-slot 110. The sliders are stored in the T-slot such that the air bearing design of the slider may be partially viewed through neck regions 102 and 104. The narrow neck regions 102 and 104 of the shipping tube 100 are used to contain the sliders within the shipping tube 100.

One drawback of the prior art shipping tube 100 is that as the industry develops smaller sliders it becomes more difficult to manufacture and machine shipping tube 100. More specifically, the T-slot becomes more difficult to extrude, particularly around the neck regions 102 and 104. Furthermore, as the dimensions of the blind surfaces 112a and 112b are reduced, they become even more difficult to clean. Particles or debris not removed from blind surfaces 112a and 112b may eventually get on the sliders stored in shipping tube 100 contaminating and adversely affecting the performance of the magnetic storage system at the head-to-disk interface. Additionally, neck regions 102 and 104 obscure the visibility of the device stored in channel 110a.

SUMMARY OF THE INVENTION

It is desirable to provide a container that is convenient to use and relatively inexpensive to manufacture.

It is also desirable to provide a container that is suitable for storing and handling sliders of various dimensions.

It is further desirable to provide a container that has a detachable cover such that the devices stored within the container may be easily inspected.

Additionally, it is desirable to provide a container that can be thoroughly cleaned (i.e., all interior surfaces of the container are exported) when disassembled.

A container for transporting at least one device is described. The container includes a bottom piece and a detachable top piece which can be secured to the bottom piece by at least one locking device. For one embodiment, several locking devices of the same design which are evenly spaced apart are used to secure the top and bottom pieces together. The bottom piece includes a base with at least one channel (also referred to as a device chamber). Additionally, the base includes two side rails that extend generally upward from the base. The inner walls of each of the side rails includes a groove. The detachable top piece is positioned above the base and between the side rails for attachment to the bottom piece. At least one locking device is positioned on top of the top piece with each of the outer ridge sections of the locking device extending into one of the grooves in the inner wall of a side rail when securing the detachable top piece to the bottom piece.

A method of packaging a device in a container is also described. The container includes a bottom piece having a base and two side walls, a top piece, and a locking device having two substantially straight edges and two curved outer ridges. Each side wall includes a groove on its inner surface. At least one device is placed into the channel in the base. The top piece is placed over the base such that the top surface of the top piece is slightly above or substantially coplanar with the bottom portion of the grooves. A locking device is placed over the top piece such that each substantially straight edge of the locking is aligned in parallel with one of the grooves. To secure the top piece to the bottom piece, the locking device is rotated approximately 90 degrees such each of the tapered edges or threads of the outer ridges extends into one of the grooves.

Other desires, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention provides a container that is useful for handling, storing, and shipping various devices. Such devices may include sliders used in magnetic storage systems and packaged or unpackaged integrated circuits. Although the container of the present invention is suitable for devices of various sizes, and it is particularly well suited for devices such as nano and pico sliders.

Figure 2:
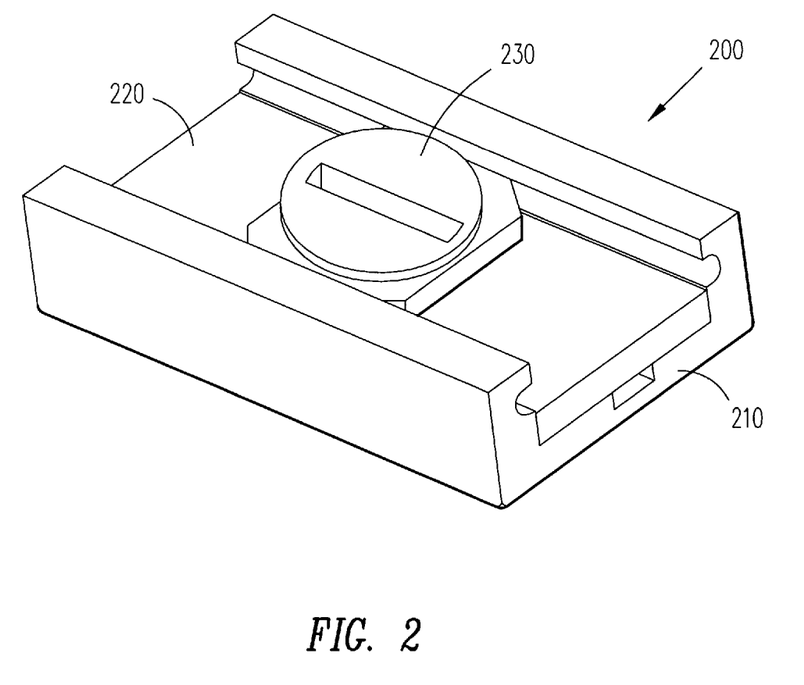
FIG. 2 illustrates a perspective view of one embodiment of a shipping container for transporting and handling devices.

FIG. 2 illustrates a perspective view of one embodiment of a container for transporting and handling a variety of devices. The shipping container 200 may be referred to as a two-piece tube because it includes a bottom piece 210 and a detachable top piece 220. For one embodiment, top piece 220 may be secured to the bottom piece by a locking device 230. The removable top piece 220 allows for better cleaning of container 200 by exposing all interior surfaces of container 200, which subsequently results in lower contamination of the devices stored in container 200. Furthermore, top piece 220 can also be removed for quick and easy inspection of the devices stored in container 200 without having to remove the devices from the container.

Figure 3A:
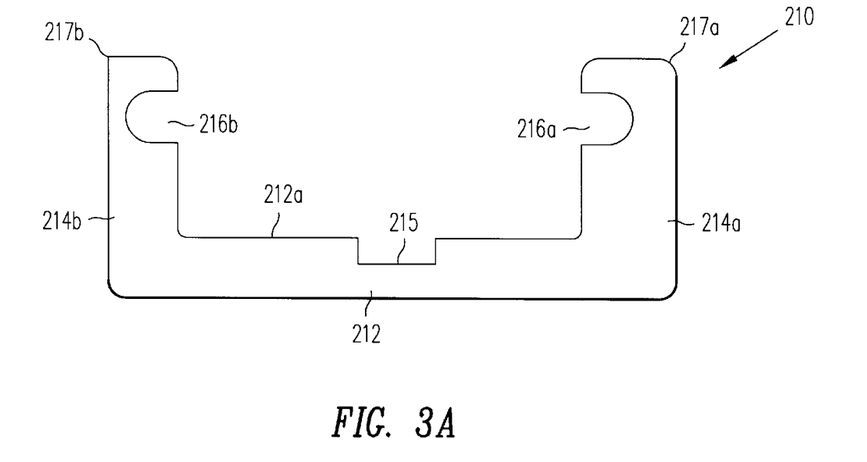
FIG. 3A illustrates a cross-sectional view of a bottom piece of the shipping container shown in FIG. 2.
Figure 3B:
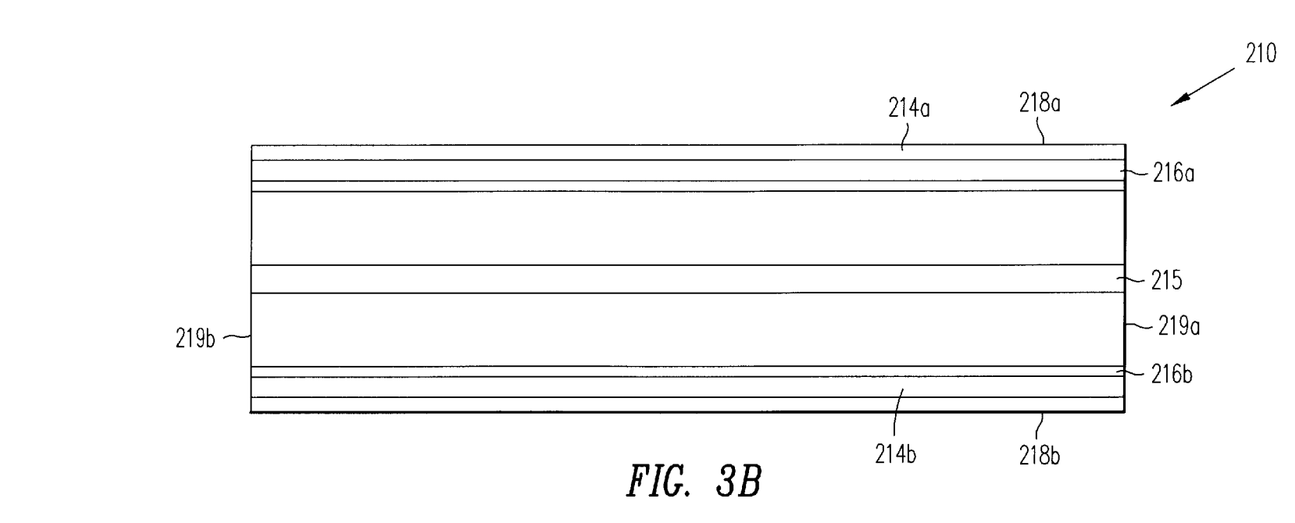
FIG. 3B illustrates a top view of the bottom piece of the shipping container shown in FIG. 2.

FIG. 3A illustrates a cross-sectional side view and FIG. 3B illustrates a top view of bottom piece 210 of container 200. According to FIG. 3A, bottom piece 210 includes a base portion 212 and two side walls 214a and 214b extending upward from base portion 212. For one embodiment, side walls 214a and 214b extend substantially perpendicular from base portion 212. Base portion 212 includes a channel 215 (also referred to as the device chamber) which may extend from one end of base 212 to the other end of base 212 as shown in FIG. 3B. For one embodiment, channel 215 is positioned equal distant between side walls 214a and 214b. For alternative embodiment, base portion 212 may include two or more channels. Typically, the width of channel 215 is slightly larger than the device in which transporting container 200 is storing. Each of the side walls 214a and 214b includes a groove on its inner surface. The grooves 216a and 216b are positioned such that when top piece 220 is placed on bottom piece 210, the top surface of top piece 220 is slightly above or substantially coplanar with the bottom portion of grooves 216a and 216b.

According to FIG. 3B, bottom piece 210 includes two side edges 218a and 218b and first and second ends 219a and 219b. Furthermore, FIG. 3B illustrates that channel 215 is substantially equal distant between side edges 218a and 218b and extends between first and second ends 219a and 219b. Grooves 216a and 216b may also extend from first end 219a to second end 219b of bottom piece 210. For alternative embodiments, grooves 216a and 216b as well as channel 215 may not extend the entire length of bottom piece 210. Bottom piece 210 may be made of a metal material such as aluminum.

For one embodiment, bottom piece 210 may have a width 11.45 mm, a height of 4.89 mm, and a length of 560 mm. The distance between the inner surfaces of side walls 214a and 214b may be 8.1 mm. Side wall 214a may have a thickness of 1.95 mm and side wall 214b may have a thickness of 1.4 mm. The differing wall thicknesses indicate a selected datum unit surface determined by machining tolerances. Grooves 216a and 216b may have a height of 1 mm and may be positioned 1.99 mm above the top surface 212a of base portion 212.

The dimensions of channel 215 typically depend on the size of the device that container 200 is storing. As mentioned above, container 200 may be used to store sliders of various dimensions. The terms nano and pico sliders are often used in the industry to describe the dimensions of a slider. Fox example, a nano slider may have dimensions on the order of 2×1.5×0.425 mm and a pico slider may have dimensions on the order of 1.5×1.0×0.3 mm. Generally, pico sliders may be on the order of 33% the size of nano sliders. In other words, pico sliders are generally 67% smaller that nano sliders.

Accordingly, when channel 215 is sized for nano sliders, the channel may have a height of 0.6 mm and a width of 2.26 mm. Similarly, when channel 215 is sized for pico sliders, the channel may have a height of 0.45 mm and a width of 1.41 mm. For one embodiment, the manufacturing process loads the sliders into tube 200 with the air bearing surface of the slider facing towards top piece 220.

Figure 4A:
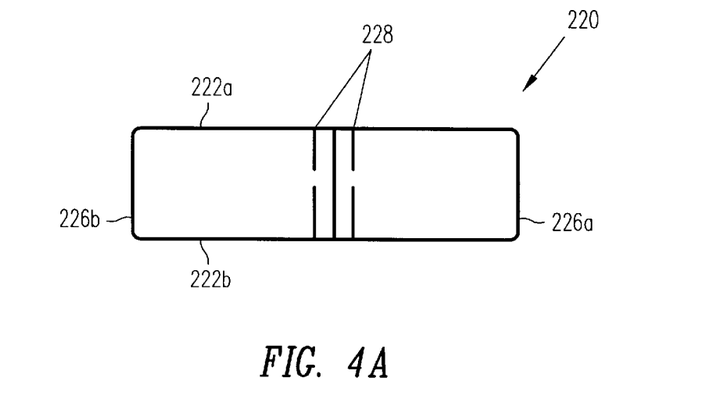
FIG. 4A illustrates a cross-sectional view of a top piece of the shipping container shown in FIG. 2.
Figure 4B:
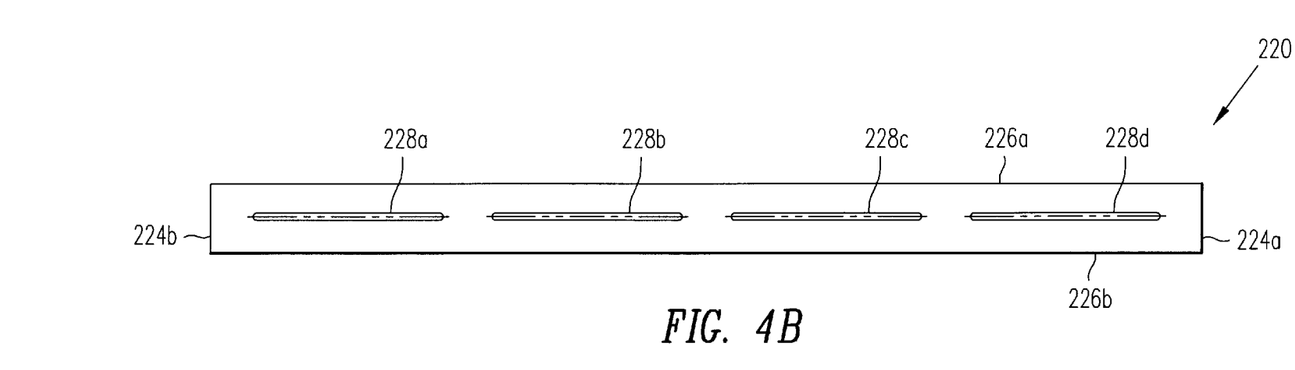
FIG. 4B illustrates a top view of the top piece of the shipping container shown in FIG. 2.

FIGS. 4A and 4B illustrate top piece 220 in more detail. FIG. 4A illustrates a cross-sectional side view and FIG. 4B illustrates a top view of top piece 220. The top surface of top piece 220 is shown by reference numeral 222a and the bottom surface of top piece 220 is shown by reference numeral 222b. Dotted lines 228 represent the location of the slots 228a–d with respect to side edges 226a and 226b of top piece 220. According to FIG. 4A, slots 228a–d extend from top surface 222a to bottom surface 222b. For one embodiment, top piece 220 includes four slots shown by 228a, 228b, 228c, and 228d which are positioned equal distance between side edges 226a and 226b such that the slots are aligned above channel 215 in bottom piece 210. For one embodiment, 224a represents a first end and 224b represents a second end of a substantially rectangular shape top piece 220. Top piece 220 may be made of a metal material such as aluminum.

For one embodiment, top piece 220 has a height of 2.13 mm, a width of 7.9 mm, and a length of 556 mm. These slots may have a width of 0.7 mm and a length of 132 mm with 5 mm between adjacent slots and the ends 224a and 224b. Generally, the slots are positioned such that locking device (shown in FIGS. 5A–C) and slider stop device (shown in FIGS. 6A–B) may be properly aligned with channel 215. The locking device is used to secure the detachable top piece 220 to bottom piece 210. For alternative embodiments, the dimensions of container 200 may vary, depending on the size of the devices to be stored.

Figure 5A:
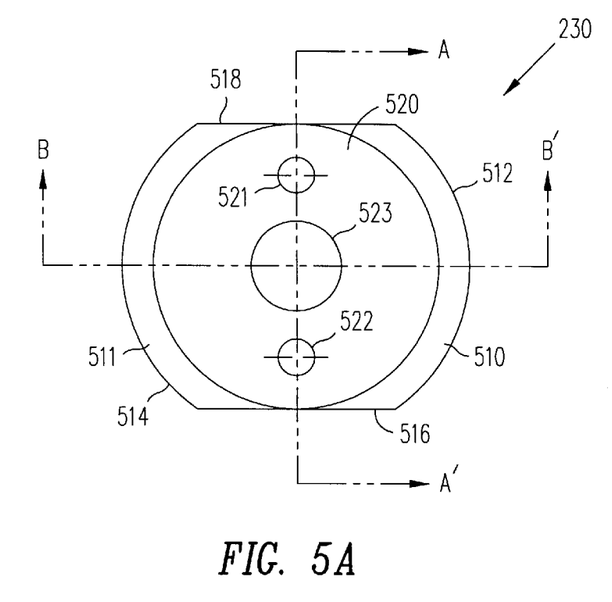
FIG. 5A illustrates a top view of a locking device of the hipping container shown in FIG. 2 where Section A-A' represents a cross-sectional view of the locking device taken along line A-A' and Section B-B' represents a cross-sectional view of the locking device taken along line B-B'.
Figure 5B:
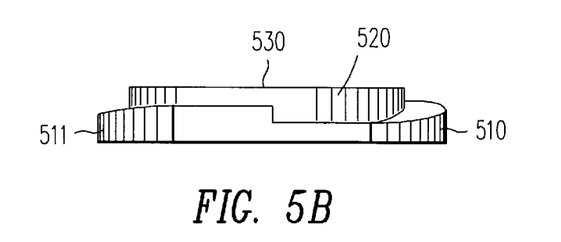
FIGS. 5B and 5C illustrate a side views of the locking device shown in FIG. 5A.
Figure 5C:
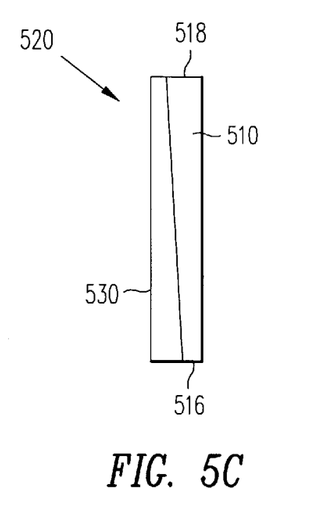

FIGS. 5A through 5C illustrate locking device 230 in more detail. Locking device 230 is a locking mechanism for securing detachable top piece 220 to bottom piece 210. Typically, more that one locking device 230 is used to secure top piece 220 to bottom piece 210. Locking device 230 may include two outer ridges 510 and 511 which have curved outer edges 512 and 514, respectively. Furthermore, locking device 230 may include two straight edges 516 and 518. The straight edges allow locking device 230 to be placed directly down onto the main channel of container 200 rather than from the ends which would have been required if the shape of the locking device 230 been a complete round shape. Locking device 230 may also include a substantially round piece 520 formed above the two outer ridge sections 510 and 511. The two outer ridge sections 510 and 511 may form two spiral ramps or partial threads around portions of round piece 520. The spiral ramps formed by the two outer ridge sections 510 and 511 are illustrated in more detail from the side views of locking device 230 shown in FIGS. 5B and 5C. For the embodiment shown in FIGS. 5A–5C, the spiral ramps gradually increase in the clock-wise direction.

The round piece 520 may include an aperture 523 extending through locking device 230. The round piece 520 may also include two apertures referred to as blind holes or counter bores 521 and 522 that extend partially through locking device 230. Through hole 523 is typically used to secure a slider stop device (shown in FIGS. 6A through 6B). Apertures 521 and 522 may be used to interface with an insertion/removal tool such as the tool shown in FIGS. 7A and 7B. Tool 700 is used to turn locking device 230 such that locking device 230 either secures top piece 220 to bottom piece 210 or releases top piece 220 from bottom piece 210.

Figure 7A:
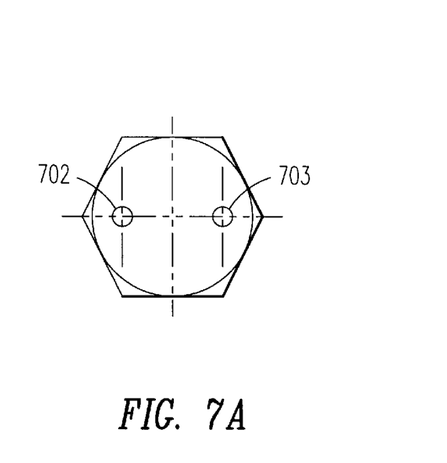
FIGS. 7A and 7B illustrate a front view and a side view, respectively, of a tool used to secure or unfasten the locking device from the shipping container.
Figure 7B:
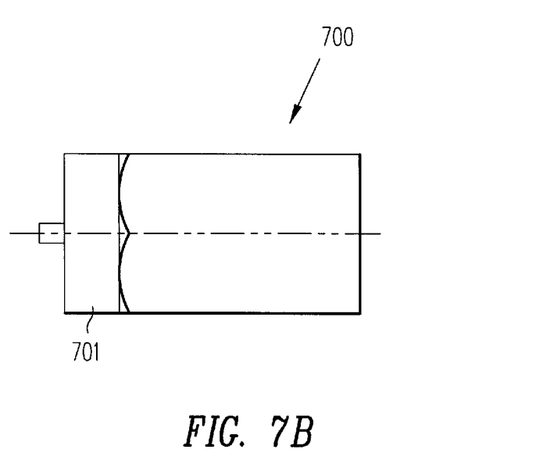

For one embodiment, tool 700, is used to twist locking device 230 in the clockwise direction such that outer ridge sections 510 and 511 extend into grooves 216a and 216b of bottom piece 210. In this particular position, one or more locking devices secure the detachable top piece 220 to bottom piece. On the other hand, when straight edges 516 and 518 of locking device 230 are aligned substantially parallel with grooves 216a and 216b, respectively, detachable top piece 220 is no longer secured to bottom piece 210. Locking device 230 may be made of various plastics such as polyetheretherketone or alternatively other suitable materials.

For one embodiment of the invention, substantially round piece 520 has a diameter of 7.8 mm, through hole 523 has a diameter of 2.5 mm, and apertures 521 and 522 have a diameter of 1 mm. Furthermore, the height of locking device 230 is 1.4 mm and the spiral ramp formed by outer ridge pieces starts at 1 mm below top surface 530 and gradually increases to 0.5 mm below top surface 530 in a counter-clockwise direction around substantially round piece 530.

When securing top piece 220 to bottom piece 210, locking device 230 is first placed above (or on top) top piece 220 with straight edges aligned substantially parallel with grooves 216a and 216b. Locking device 230 is then rotated or turned approximately 90° clockwise such that the two outer ridges 510 and 511 extend into groves 216a and 216b, and straight edges 516 and 518 are aligned substantially parallel to the two ends 224a and 224b of top piece 220.

Figure 6A:
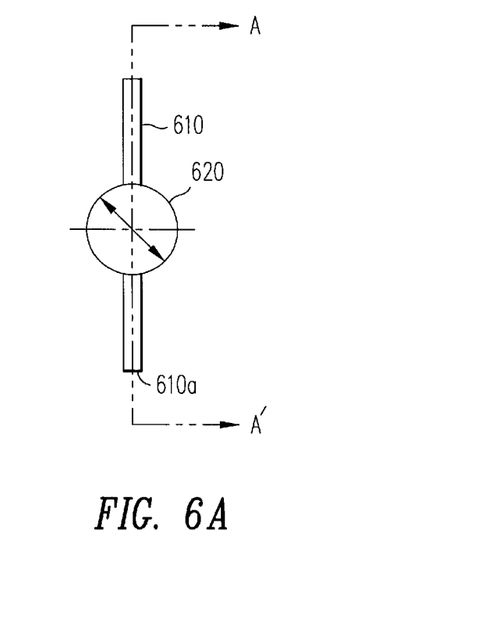
FIG. 6A illustrates a top view of an end stop device of the shipping container shown in FIG. 2.
Figure 6B:
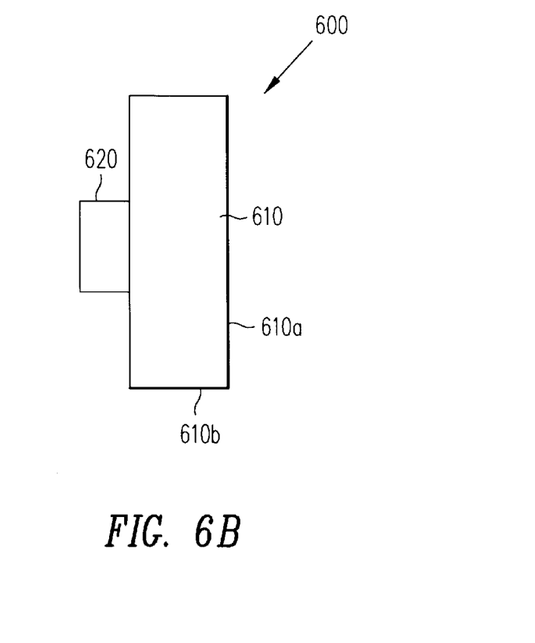
FIG. 6B illustrates a cross-sectional view of the locking device taken along line A-A' of FIG. 6A.

FIGS. 6A and 6B illustrate top and side views, respectively, of one embodiment of a slider stop device. Slider stop device 600 generally includes two sections. The first section 610 has a width 610a, a height 610b and a length 610c. Typically, the width 610a is sized to fit into one of the slots 228a–d in top piece 220. Additionally, the height 610b is sized such that when it is inserted into a slot in top piece 220, slider stop device 600 extends through the slot and into the channel 215 in bottom piece 210. First portion 610 is only required to extend deep enough into channel 215 to prevent the devices stored in channel 215 from sliding out of the container. For one embodiment, first portion 610 has a rectangular shape.

The slider stop device 600 also includes a second portion 620. For one embodiment, the second portion 620 has a substantially cylindrical shape. Typically, second portion 620 is sized to fit into the aperture or through hole 523 of locking device 230. Thus, when packaging a device within the container of the present invention, slider stop device 600 is first inserted into one of the slots in top piece 220 and then locking device 230 is placed above top piece 220 such that second portion 620 is inserted into aperture 523 in top piece 220. It is not required that slider stop device 600 be placed near ends 224a or 224b of top piece 220. Slider stop devices 600 may be used at any location where top piece 220 has a slot and where locking device 230 may be secured.

The insertion/removal tool 700 is simply a shaft 701 with two pins 702 and 703 extending beyond the squared end of the shaft. Acting much like a spanner wrench, when two pins 702 and 703 are inserted into the corresponding holes 521 and 522 of tube locking device 230 and a clockwise torque is applied to insertion/removal tool 700, tool 700 will turn locking device 230 to engage locking device 230 into grooves 216a and 216b of bottom piece 210 and securing top cover 220 to bottom piece 210. Conversely, a counter clockwise torque applied to insertion/removal tool 700 will disengage locking device 230 from the bottom and top pieces of container 200.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A container for transporting at least one device comprising:

a bottom piece having first and second ends and a base extending between said first and second ends, said base including at least one device chamber, said bottom piece further including two side rails extending generally upward from said base between said first and second ends wherein an inner wall of each of said side rails includes a groove;

a detachable top piece having two side edges, said top piece positioned above said base and between said first and second ends of said bottom piece for attachment to said bottom piece; and at least one locking device having two outer ridge sections, said locking device positioned above said top piece and extending each of said outer ridge sections into one of said grooves when securing said bottom and top pieces together.

2. The shipping container of claim 1, further including a first slider stop device and wherein said top piece includes top and bottom surfaces and at least one slot extending from said top surface to said bottom surface, said at least one slot positioned between said two side edges of said top piece such that said slider stop device capable of extending through said slot of said top piece and into said device chamber of said base.

3. The shipping container of claim 2, wherein said locking device includes an aperture extending from its top surface through to its bottom surface, and wherein said slider stop device is capable of extending through said aperture.

4. The shipping container of claim 1, wherein said locking device further includes a substantially round top piece, and wherein each of said two outer ridge sections of said locking device has a curved edge that forms a spiral ramp around a portion of the outer edges of said substantially round top piece.

5. The shipping container of claim 4, wherein said locking device further includes two substantially straight outer edges, each of said substantially straight outer edge formed between two of said outer ridge sections.

6. The shipping container of claim 4, wherein each of said grooves extends between said first and second ends of said bottom piece.

7. The shipping container of claim 4, wherein said substantially round piece of said locking device includes at least two blind holes, said at least two blind holes configured to receive a tool for positioning said locking device in a locked position or unlocked position.

8. The shipping container of claim 1, wherein said bottom piece and said top piece are formed of metal.

9. The shipping container of claim 1, wherein said bottom and said top pieces are formed of ceramic.

10. A container for transporting at least one device, comprising:

a bottom piece having a base with at least one channel configured to hold at least one device, said bottom piece further including two side walls, each of said side walls having a groove located on its inner surface;

a top piece supported by said base; and a locking mechanism supported by said top piece, said locking mechanism having two substantially straight edges and two outer ridge sections with curved edges, each of said outer ridge sections extending into one of said grooves to secure said bottom piece and said top piece, each of said substantially straight edges positioned substantially parallel with one of said grooves to release said top piece from said bottom piece.

11. A method of packaging a device in a container including a bottom piece, a top piece, and a locking device, said bottom piece having a base with a channel and two side walls, each of said side walls having a groove on its inner surface, said top piece having a top surface and a bottom surface and at least one slot extending from said top surface to said bottom surface, and said locking device having two substantially straight edges and two outer ridges having curved edges, comprising the steps of:

(a) placing at least one device into said channel in said base;

(b) placing said top piece over said base such that said top surface of said top piece is substantially coplanar with a bottom portion of each of said grooves;

(c) placing said locking device over said top piece with each substantially straight edge aligned in parallel to one of said grooves; and (d) rotating said locking device approximately 90 degrees such that said curved edges of each of said outer ridges extends into one of said grooves.

12. The method of claim 11, further comprising, prior to step (c), the step of:

(e) inserting at least one slider stop device into at least one slot of said top piece.

\* \* \* \* \*